Oct. 26, 1971  B. H. DIB  3,614,939

PADDLING DEVICE FOR BOATS

Filed July 28, 1969  3 Sheets-Sheet 1

Bassil H. Dib
INVENTOR.

BY Clarence A. O'Brien
and Harvey B. Jacobson
Attorneys

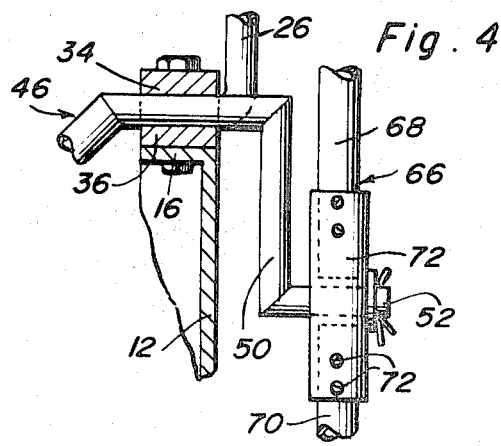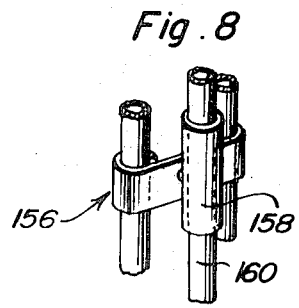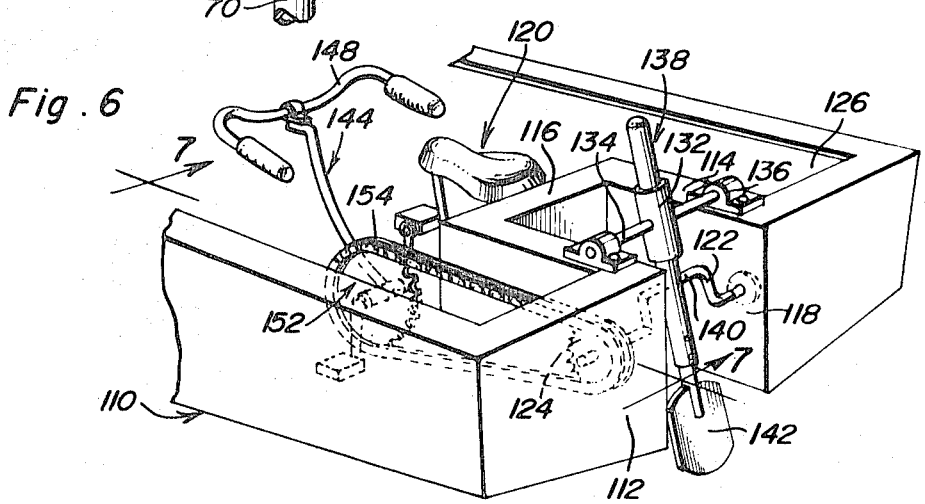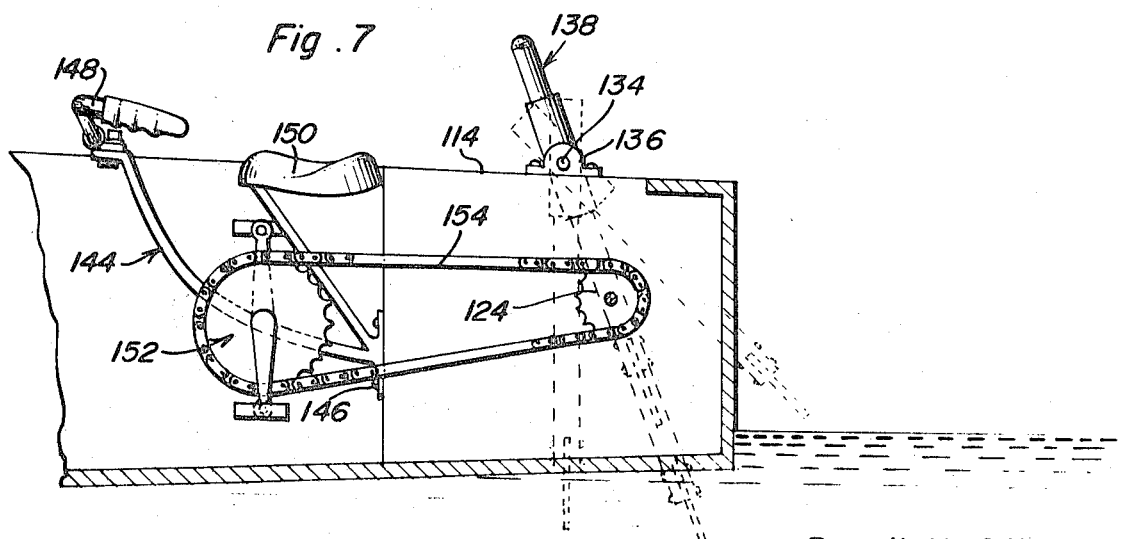

Oct. 26, 1971     B. H. DIB     3,614,939

PADDLING DEVICE FOR BOATS

Filed July 28, 1969     3 Sheets-Sheet 3

Bassil H. Dib
INVENTOR.

BY *Clarence A. O'Brien*
*and Harvey B. Jackson*
Attorneys

United States Patent Office 3,614,939
Patented Oct. 26, 1971

3,614,939
PADDLING DEVICE FOR BOATS
Bassil H. Dib, Port St., P.O. Box 6986,
Marius Ged Bldg., Beirut, Lebanon
Filed July 28, 1969, Ser. No. 845,247
Int. Cl. B63h 1/06
U.S. Cl. 115—67                                    4 Claims

ABSTRACT OF THE DISCLOSURE

A boat paddling assembly including a rotary input shaft drivingly connected to a paddle member for imparting paddling movement thereto. The assembly includes an upstanding stationary guide from which the upper end of an upright paddle is slidingly and oscillatably supported and a crank throw of a journaled crankshaft has a midportion of the paddle member journaled thereon with a dog clutch structure being provided on one form of the invention for selectively declutching the crank throw from the crankshaft.

---

The paddling device of the instant invention has been designed to provide a means whereby a rowboat or the like may be efficiently paddled, either forward or in reverse, by unskilled boatmen as well as skilled boatmen. The paddling device includes a first form which is adapted to be actuated by the arms of the user and a second form which is actuated in the manner in which a conventional bicycle is powered, through a crank sprocket assembly.

The paddling device may be disposed transversely of an associated boat and provided with driven paddle members on opposite ends thereof disposed outwardly of the boat sides or the paddling device may be stren mounted and include only a single paddle member disposed on the longitudinal centerline of the associated boat.

The main object of this invention is to provide a boat paddling assembly which may be readily actuated by unskilled boatmen as well as skilled boatmen to paddle an associated boat in an efficient manner.

Another object of this invention, in accordance with the immediately preceding object, is to provide a paddling assembly which may be foot actuated through a pedal crank and sprocket assembly.

Still another object of this invention is to provide a boat paddling assembly including either a central stern mounted paddle member or a pair of opposite side paddle members and which may be actuated through movements of only one hand of the user.

Yet a further object of this invention is to provide a boat paddling assembly that may be readily attached to various types of boat hulls suitable for manual power.

Another object of this invention is to provide a boat paddling assembly which may be readily modified so as to be motor driven, if desired.

A still further object of this invention is to provide a boat paddling assembly in accordance with the preceding objects and including opposite side paddle units which may be selectively declutched from the drive portion of the assembly so as to thereby enable the associated boat to be steered.

A final object of this invention to be specifically enumerated herein is to provide a boat paddling assembly which will conform to conventional forms of manufacture, be of simple construction and easy to use so as to provide a device that will be economically feasible, long lasting and relatively trouble-free in operation.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIG. 4 is an enlarged fragmentary transverse vertical sectional view taken substantially upon the plane indicated by the section line 4—4 of FIG. 1;

FIG. 6 is a fragmentary perspective view of the rear end portion of a boat whose transom construction is modified and has a crank pedal and sprocket assembly powered form of the boat paddling assembly operatively associated therewith;

FIG. 7 is an enlarged fragmentary longitudinal vertical sectional view taken substantially upon the plane indicated by the section line 7—7 of FIG. 6;

FIG. 8 is a fragmentary perspective view of a modified form of guide assembly which may be utilized in lieu of the paddle guide assemblies illustrated in FIGS. 1-3 and 5;

Figure 1:
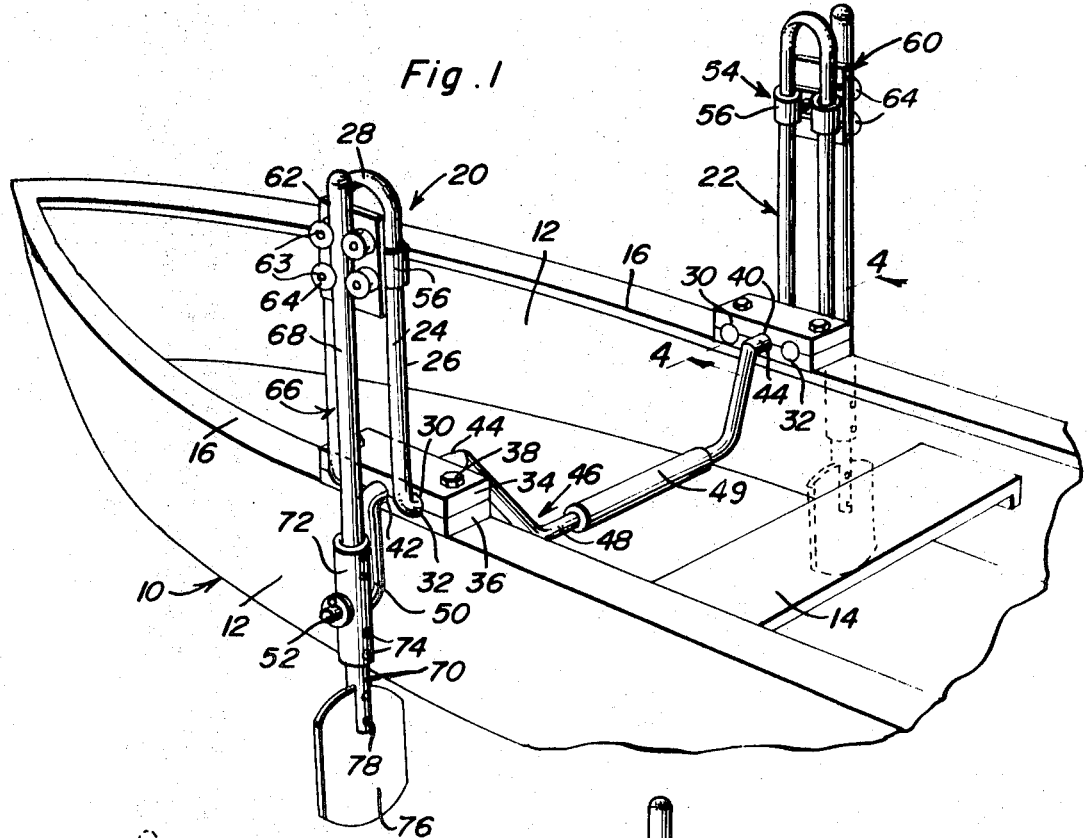
FIG. 1 is a fragmentary perspective view of a rowboat upon which the arm actuated double paddle form of the paddling assembly has been operatively mounted.

Referring now more specifically to the drawings, the numeral 10 generally designates a boat including opposite sides 12 interconnected by a horizontal transverse seat 14. The upper marginal edge portions of the sides 12 define gunwales 16 and the boat paddling device of the instant invention is referred to in genral by the reference numeral 20. The device 20 includes a pair of upstanding support assemblies referred to in general by the reference numerals 22 supported from corresponding gunwales 16 and each assembly 22 includes an inverted U-shaped frame 24 consisting of a pair of parallel legs 26 interconnected at their upper ends by means of an integral curved bight portion 28. The lower ends of the legs 26 of each frame 24 are directed inwardly and clamped in opposing upper and lower semi-cylindrical recesses 30 and 32 formed in a pair of vertically stacked mounting blocks 34 and 36 clamped together and secured to the corresponding gunwale 16 by means of suitable fasteners 38. In addition, each pair of blocks 34 and 36 includes opposing recesses 40 and 42 in which the journal sections 44 of a crankshaft referred to in general by the reference numeral 46 are journaled. The crankshaft 46 includes a central crank pin portion 48 upon which a handgrip defining sleeve 49 is rotatably journaled and the remote ends of the journal pins or sections 42 of the crankshaft 46 terminate in crank arms 50 whose free ends are outurned and define terminal end crank pins 52.

A mount assembly referred to in general by the reference numeral 54 is provided on each support assembly 22 and each mount assembly 54 includes a clamp 56 clampingly engaged with the corresponding legs 26 and provided with an outwardly projecting stub axle or pin portion 58 upon which a guide structure referred to in general by the reference numeral 60 is oscillatably supported. Each guide structure 60 includes a mounting plate 62 and two pairs of upper and lower outwardly projecting journal pins 63 upon which flanged rollers 64 are journaled.

The device 20 includes two paddle members referred to in general by the reference numerals 66 and each paddle member 66 includes upper and lower end sections 68 and 70 whose adjacent ends are secured within opposite end portions of a sleeve member 72 in axially spaced relation by means of suitable fasteners 74. The lower end of each lower end section 70 has a paddle element 76 secured thereto by means of fasteners 78 and the mid-portion of each sleeve member 72 is journaled on the corresponding crankpin 52. The flanged rollers 64 supported from each mounting plate 62 rollingly engage diametrically opposite portions of the corresponding upper end section 68 and thus it may be seen that each paddle member 66 is supported for longitudinal reciprocation relative to the corresponding guide structure 60 and oscillation about a horizontal transverse axis with the corresponding mounting plate 62 relative to the associated frame 24.

Figure 2:
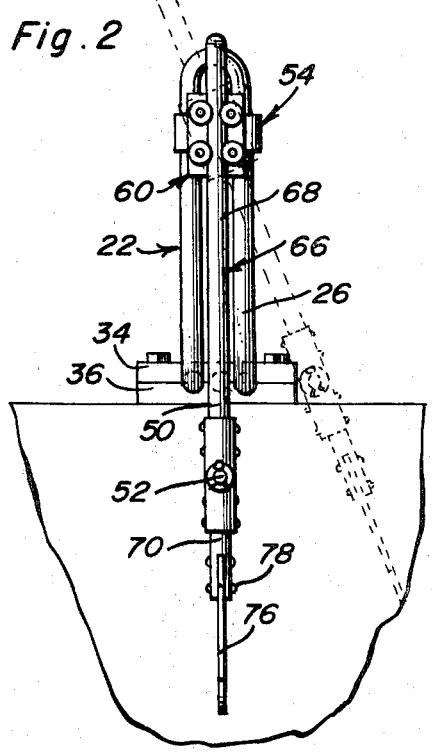
FIG. 2 is a fragmentary side elevational view of the assembly illustrated in FIG. 1 and with an alternate position of the paddle member illustrated in phantom lines.
Figure 3:
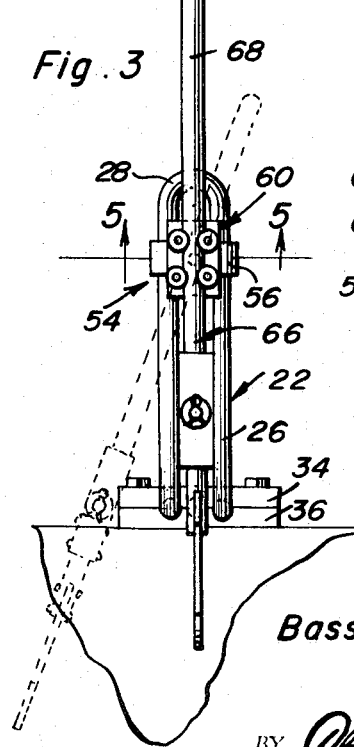
FIG. 3 is a fragmentary side elevational view similar to FIG. 2 but illustrating the paddle member in further alternate positions.
Figure 5:
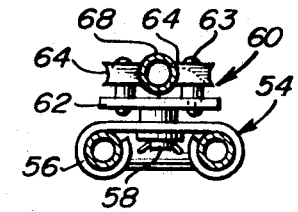
FIG. 5 is an enlarged fragmentary horizontal sectional view taken substantially upon the plane indicated by the section line 5—5 of FIG. 3.

From a comparison of FIGS. 1–3, it is believed that it will be readily apparent that the handgrip 49 may be engaged by either one or two hands of a person seated on the seat 14 and swung about a circular path so as to cause rotation of the crankshaft 46 and thus vertical reciprocation as well as oscillation of the paddle members 66 about horizontal transverse axes. In this manner, the paddle members 66 are caused to move in a manner simulating conventional paddling movements and the boat 10 may thus be propelled over a body of water.

With reference now more specifically to FIGS. 6 and 7 of the drawings, there may be seen a modified form of boat referred to in general by the reference numeral 110 including a somewhat modified transom 112. The transom 112 includes spaced forwardly projecting wall portions 114 interconnected at their forward ends by means of a transverse wall portion 116 and the wall portions 114 and 116 define a rearwardly opening well 118 in the center of the transom 112.

The paddling device utilized in conjunction with the boat 110 is referred to in general by the reference numeral 120 and includes a crankshaft 122 journaled through the wall portions 114 and having a sprocket wheel 124 mounted on one end portion within the boat 110.

A sleeve member 132 is provided and includes axially aligned diametrically oppositely outwardly projecting stub axle portions 134 whose free ends are journaled in journal blocks 136 supported from the upper edge portions of the wall portions 114. A paddle member referred to in general by the reference numeral 138 is provided and is longitudinally reciprocally received through the sleeve member 132 and has a lower end portion thereof journaled on the central crankpin portion 140 of the crankshaft 122. The lower end of the paddle member 138 is provided with a paddle element 142 similar to the paddle element 76 and thus it may be seen that upon rotation of the crank shaft 122 the paddle member 138 will be caused to move in a manner to paddle the boat 110.

A bicycle simulating frame referred to in general by the reference numeral 144 is secured to the front surface of the wall portion 116 by means of suitable fasteners 146 and includes a handle bar assembly 148 as well as an operator's seat 150. Further, the frame 144 includes a conventional pedal crank and sprocket assembly referred to in general by the reference numeral 152 which is journaled from the frame 144 in any convenient manner and an endless chain 154 is entrained about the assembly 152 and the sprocket wheel 124 whereby rotation of the assembly 152 will cause rotation of the crankshaft 122.

With attention now invited more specifically to FIG. 8 of the drawings there will be seen a modified form of mounting assembly referred to in general by the reference numeral 156 and which may be utilized in lieu of the mounting assembly 54. The mounting assembly 156 is substantially identical to the mounting assembly 54 except that the assembly 156 includes an oscillatable guide tube 158 through which the corresponding paddle member 160 is longitudinally and slidably received instead of being provided with the mounting plate 62 and flange rollers 64. Of course, the sleeve or tube 158 is oscillatably supported from the mounting assembly 156. As hereinbefore set forth, even an unexperienced boatman may actuate either the devic 20 or the devic 120.

With reference now to FIGS. 9–12 of the drawings, there will be seen another modified form of paddling device referred to in general by the reference numeral 164. The device 164 includes a pair of opposite side upstanding support assemblies 166 (only one of which is illustrated) and each support assembly 166 includes an inverted U-shaped frame 168 consisting of a pair of parallel legs 170 interconnected at their upper ends by means of a curved inverted U-shaped bight portion 172. The lower ends of the legs 170 are directed inwardly and secured to an upper clamp plate or mounting block which is secured to a lower clamp plate or mounting block 176 supported from the side 178 of an associated boat. The upper mounting block 174 is secured to the lower block 176 by means of removable fasteners 180 and the confronting surfaces of the blocks 174 and 176 include registered downwardly and upwardly opening semi-cylindrical recesses 182 and 184 which together form a horizontal bore 186 extending transversely of the side 178.

The paddling device 164 includes a crankshaft 188 which is similar to the crankshaft 46. However, the crankshaft 188 includes opposite end journal sections 190 which are spaced inwardly from the sides 178 and have clutch disks 192 secured thereon spaced from their remote ends. The clutch disks 192 include generally radially extending and axially opening grooves 194 and each end of the crankshaft 188 includes a tubular journal section 196 which is telescoped over the outer end of the corresponding journal section 190. Each journal section 196 is journaled through the corresponding bore 186 and a second clutch disk 198 is provided on each journal section 196 and slidable longitudinally there along but keyed to the corresponding journal section 196 for rotation therewith. Of course, the tubular journal section 196 may be rotated relative to the corresponding journal section 190 and it may be seen from FIG. 10 of the drawings that each of the clutch disks 198 includes a projection 200 which is receivable in the corresponding recess 194 so as to key the journal sections 190 and the corresponding journal sections 196 for simultaneous rotation.

The second clutch disk 198 defines a circumferential groove 202 in which a ring or sleeve 204 is journaled and retained against axial shifting.

A lever 206 is oscillatably supported from the side 178 by means of a bracket 208 and a pivot fastener 210 and the upper end of the lever 206 is bifurcated and pivotally secured to the ring or sleeve 204 by means of pivot fasteners 212. Further, a compression spring 214 is disposed about the journal section 196 between the upper and lower blocks 174 and the adjacent end of the second disk 198.

A treadle bell crank 216 is supported from the bottom 218 by means of a bracket 220 supported from the bottom 218 and a pivot fastener 222 pivotally securing the bell crank 216 to the bracket 220. A connecting link 224 is connected between the lower end of the lever 206 and the upper end of the upstanding arm of the bell crank 216. Accordingly, upon the application of downward pressure on the foot engageable tread portion 226 carried by the bell crank 216, the upper end of the lever 206 will be swung outward so as to compress the compression spring 214 and shift the second clutch disk 198 away from the first clutch disk 192 so as to withdraw the projection 200 from the recess 194 and allow rotation of the crankshaft 188 independent of rotation of the journal section 196.

A mount referred to in general by the reference numeral 230 is secured in adjusted elevated position on the support assembly 166 and includes an outwardly projecting stub shaft portion 232 upon which an upstanding sleeve 234 is oscillatably journaled. The outer end of the journal section 196 terminates in a right angulated crank arm 236 and the free end of the crank arm 236 terminates in a right angulated crankpin 238 which parallels the journal section 196. A sleeve 240 is oscillatably disposed on the crankpin 238 and secured thereon by means of a cotter pin 242 and a paddle member referred to in general by the reference numeral 246 is provided. The paddle member 246 includes a first shank section 248 whose upper end is slidably received through the sleeve 234 and whose lower end is secured in the upper end of the sleeve 240. The paddle member 246 includes a lower shank section 250 whose upper end is secured in the lower end of the sleeve 240 and upon whose lower end a paddle blade 252 is secured. Accordingly, it may be seen that the paddling device 164 may be utilized to propel the associated boat in the same manner in which the paddle assembly 20 may be used. However, when it is desired to steer the boat to the right, the operator of the paddle assembly or paddling device 164 may depress the right foot engageable treadle portion 226 so as to declutch the corresponding paddle member 246 for at least one revolution of the crankshaft 188. It will be noted that the foot engageable treadle portion 226 need be only momentarily depressed in order to angularly displace the recess 194 ahead of the projection 200. Thereafter, until the first clutch disk 192 completes one complete revolution, the outer extremity of the projection 200 will ride on the outer face of the clutch disk 192 and drop into the recess 194 as soon as the recess again moves into registry with the projection 200.

Figure 9:
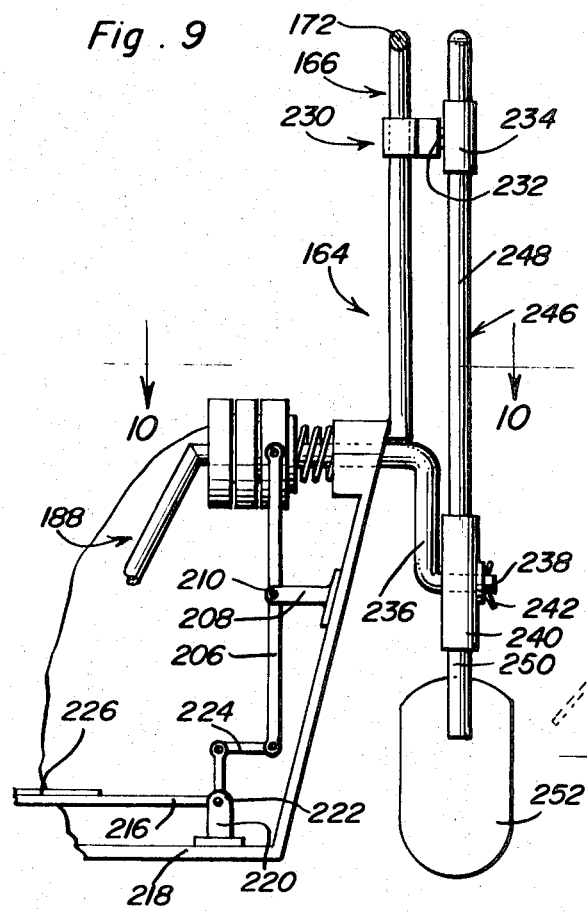
FIG. 9 is a fragmentary rear elevational view of one side of a modified double paddle form of the invention including structure for selectively rendering each paddle unit inoperative for steering purposes.
Figure 12:
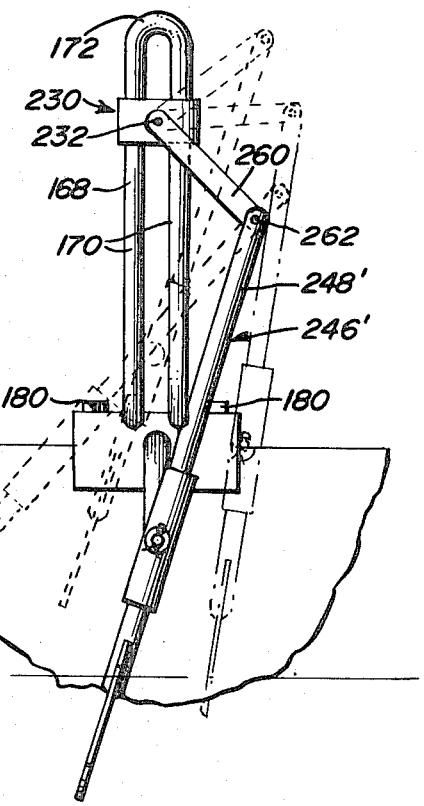
FIG. 12 is a side elevational view of a slightly modified form of the assemblage illustrated in FIG. 9.
Figure 10:
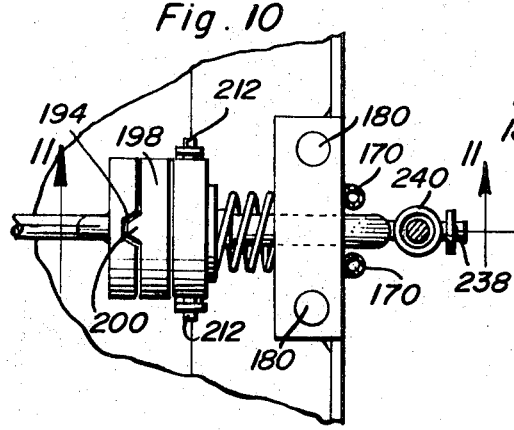
FIG. 10 is a horizontal sectional view taken substantially upon the plane indicated by the section line 10—10 of FIG. 9.
Figure 11:
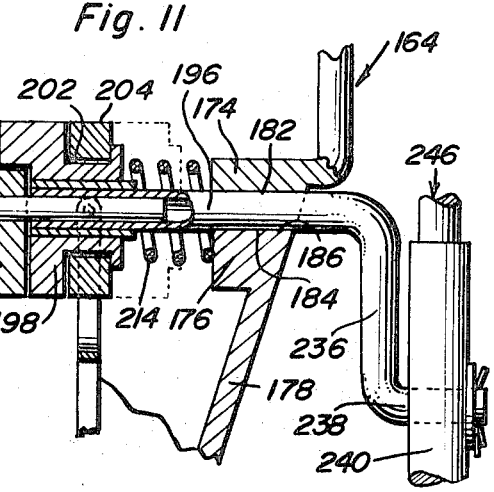
FIG. 11 is a vertical sectional view taken substantially upon the plane indicated by the section line 11—11 of FIG. 10.

With attention now directed more specifically to FIG. 12 of the drawings, it will be seen that the embodiment illustrated in FIG. 12 is slightly different from the embodiment illustrated in FIGS. 9–11 in that the upper shank section 248' is slightly shorter and has its upper end pivotally secured to one end of a link 260 by means of a pivot fastener 262. The other end of the link 260 is pivotally secured to the pivot shaft portion 232 which supports the sleeve 234 in the embodiment illustrated in FIGS. 9–11. Therefore, the embodiment illustrated in FIG. 12 is only slightly different from the embodiment illustrated in FIGS. 9–11. However, from the phantom line positions of the paddle member 246' shown in FIG. 12 of the drawings, it may be seen that the paddle member 246' is more advantageously inclined throughout the full cycling movement of the paddle member 246' due to the connection of the upper end of the paddle member 246' to the link 260 which is in turn supported from the pivot shaft or fastener 232.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. A paddling device for boats including an upright support for mounting on a peripheral portion of a boat and including a pair of upstanding parallel guide members rigidly interconnected at their upper ends, a mounting base to which the lower ends of said guide members are rigidly anchored and adapted for stationary mounting on said peripheral portion, a crank shaft journalled from said mounting base for rotation about an horizontal axis disposed generally normal to a plane containing said guide members and including an eccentric pin portion, an upright paddle member, means journalling a lower end portion of said paddle member from said pin portion, a slide mount supported on said guide members for adjustable positioning therealong, a guide structure supported from said slide mounting for oscillation relative thereto about an axis generally paralleling the axis of rotation of said crank shaft, said guide structure including vertically spaced pairs of horizontally spaced apart guide wheels journalled from said guide structure for rotation about axes generally paralleling said axis of rotation of said crank shaft, the upper end portion of said paddle member being reciprocally received between the guide wheels of said pairs of guide wheels with the latter rollingly engaged with opposite sides of said upper end portion at points spaced longitudinally therealong.

2. The combination of claim 1 wherein said pair of upstanding parallel guide members comprise the depending leg portions of an inverted generally U-shapde frame including a bight portion interconnecting the upper ends of said leg portions, said mounting base including a pair of vertically stacked components secured together, the lower ends of said leg portions including laterally directed terminal ends clampingly secured between said stacked components.

3. The combination of claim 2 wherein said stacked components include coacting opposing journal portions disposed between said terminal ends through which said crank is journalled.

4. The combination of claim 3 including a boat having opposite side gunnel portions, a pair of said paddling devices with the mounting base portions thereof secured to the opposite side gunnel portions of said boat, said eccentric pin portions being disposed outwardly of the sides of said boat, the ends of said crank shafts remote from said pin portions including second aligned concentric pin portions disposed inwardly of the sides of said boat, and a connecting sleeve telescoped over the adjacent ends of the last mentioned eccentric pins.

References Cited

UNITED STATES PATENTS

| 300,982 | 6/1884 | Kibler | 115—67 |
| 441,050 | 11/1890 | Barcroft | 115—67 |

FOREIGN PATENTS

| 8,805 | 1/1841 | Great Britain | 115—66 |

ANDREW H. FARRELL, Primary Examiner